United States Patent
Pickford et al.

(10) Patent No.: US 10,667,548 B2
(45) Date of Patent: *Jun. 2, 2020

(54) DRIED CRUMB MANUFACTURE

(71) Applicant: Crisp Sensation Holding S.A., Geneva (CH)

(72) Inventors: Keith Graham Pickford, Manchester (GB); Kees van Doorn, Tilburg (NL); Carry Reichgelt, Riethoven (NL)

(73) Assignee: Crisp Sensation Holding S.A., Geneva (CH)

( * ) Notice: Subject to any disclaimer, the term of this patent is extended or adjusted under 35 U.S.C. 154(b) by 629 days.

This patent is subject to a terminal disclaimer.

(21) Appl. No.: 15/133,083

(22) Filed: Apr. 19, 2016

(65) Prior Publication Data

US 2016/0235100 A1 Aug. 18, 2016

Related U.S. Application Data

(63) Continuation of application No. 14/505,402, filed on Oct. 2, 2014, now Pat. No. 9,433,237, which is a
(Continued)

(51) Int. Cl.

| | |
|---|---|
| *A23L 29/212* | (2016.01) |
| *A23P 30/20* | (2016.01) |
| *A23L 29/231* | (2016.01) |
| *A23L 29/238* | (2016.01) |
| *A23L 29/25* | (2016.01) |
| *A23L 29/256* | (2016.01) |
| *A23L 7/157* | (2016.01) |

(Continued)

(52) U.S. Cl.
CPC ............ *A23L 29/212* (2016.08); *A23K 30/20* (2016.05); *A23L 7/157* (2016.08); *A23L 29/231* (2016.08); *A23L 29/238* (2016.08); *A23L 29/25* (2016.08); *A23L 29/256* (2016.08); *A23L 29/27* (2016.08); *A23P 30/20* (2016.08); *A23V 2002/00* (2013.01)

(58) Field of Classification Search
None
See application file for complete search history.

(56) References Cited

U.S. PATENT DOCUMENTS

| | | |
|---|---|---|
| 2,446,175 A | 8/1948 | Gerber |
| 3,052,545 A | 9/1962 | Ducharme et al. |

(Continued)

FOREIGN PATENT DOCUMENTS

| | | |
|---|---|---|
| CA | 980164 A | 12/1975 |
| DE | 2220528 A1 | 12/1972 |

(Continued)

OTHER PUBLICATIONS

United States Patent and Trademark Office, "Office Action," issued in connection with U.S. Appl. No. 13/331,900, dated Dec. 7, 2012.
(Continued)

*Primary Examiner* — Tamra L. Dicus
(74) *Attorney, Agent, or Firm* — Nyemaster Goode, P.C.

(57) ABSTRACT

A method of manufacture of a breadcrumb coating for a food product provides a crumb with an extremely low moisture content without the need for substantial energy input. The method achieves such very low moisture content without significant adverse effect on product quality.

20 Claims, 2 Drawing Sheets

Related U.S. Application Data continuation of application No. 14/029,681, filed on Sep. 17, 2013, now abandoned, which is a continuation of application No. 13/331,900, filed on Dec. 20, 2011, now abandoned.

(51) Int. Cl.
  *A23K 30/20* (2016.01)
  *A23L 29/269* (2016.01)

(56) References Cited

U.S. PATENT DOCUMENTS

| | | |
|---|---|---|
| 3,067,921 A | 12/1962 | Reifers |
| 3,208,851 A | 9/1965 | Antinori et al. |
| 3,251,531 A | 5/1966 | Hook et al. |
| 3,399,062 A | 8/1968 | Willard, Jr. et al. |
| 3,486,904 A | 12/1969 | Ziegler |
| 3,586,512 A | 6/1971 | Mancuso et al. |
| 3,597,227 A | 8/1971 | Murray et al. |
| 3,619,208 A | 11/1971 | Bahoshy et al. |
| 3,656,969 A | 4/1972 | Horn |
| RE27,531 E | 12/1972 | Murray et al. |
| 3,751,268 A | 8/1973 | Van Patten et al. |
| 3,857,976 A | 12/1974 | Szymanski et al. |
| 3,899,602 A | 8/1975 | Rutenberg et al. |
| 3,904,429 A | 9/1975 | Eastman et al. |
| 3,904,601 A | 9/1975 | Tessler et al. |
| 3,915,532 A | 10/1975 | Ashton |
| 3,956,515 A | 5/1976 | Moore et al. |
| 3,969,340 A | 7/1976 | Tessler et al. |
| 3,970,767 A | 7/1976 | Tessler et al. |
| 4,020,564 A | 5/1977 | Bayliss |
| 4,068,009 A | 1/1978 | Rispoli et al. |
| 4,192,900 A | 3/1980 | Cheng |
| 4,208,442 A | 6/1980 | Evans et al. |
| 4,218,485 A | 8/1980 | Lee et al. |
| 4,260,637 A | 4/1981 | Rispoli et al. |
| 4,308,286 A | 12/1981 | Anstett et al. |
| 4,342,788 A | 8/1982 | Clatfelter |
| 4,364,961 A | 12/1982 | Darley et al. |
| 4,393,088 A | 7/1983 | Matsusaka |
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A | 9/1986 | Mao et al. |
| 4,609,558 A | 9/1986 | Giacone et al. |
| 4,623,552 A | 11/1986 | Rapp |
| 4,767,637 A | 8/1988 | Ek |
| 4,778,684 A | 10/1988 | D'Amico et al. |
| 4,864,089 A | 9/1989 | Tighe et al. |
| 4,877,628 A | 10/1989 | Stypula |
| 4,908,487 A | 3/1990 | Sarnoff et al. |
| 4,913,918 A | 4/1990 | Stypula |
| 4,915,970 A | 4/1990 | Coffeey |
| 4,916,831 A | 4/1990 | Yasumura et al. |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |
| 5,057,329 A | 10/1991 | Stypula et al. |
| 5,088,179 A | 2/1992 | Gibbon |
| 5,093,176 A | 3/1992 | Pribonic et al. |
| 5,175,010 A | 12/1992 | Roig et al. |
| 5,202,138 A | 4/1993 | Stypula |
| H1229 H | 9/1993 | McGinley et al. |
| 5,266,340 A | 11/1993 | Samson et al. |
| 5,281,432 A | 1/1994 | Zallie et al. |
| 5,308,636 A | 5/1994 | Tye et al. |
| 5,310,977 A | 5/1994 | Stenkamp et al. |
| 5,310,980 A | 5/1994 | Beckett |
| 5,321,900 A | 6/1994 | Meyer |
| 5,350,585 A | 9/1994 | Sunderland |
| 5,423,477 A | 6/1995 | Valdman et al. |
| 5,431,944 A | 7/1995 | Melvej |
| 5,433,966 A | 7/1995 | Wolt et al. |
| 5,492,707 A | 2/1996 | Chalupa et al. |
| 5,523,102 A | 6/1996 | Morasch |
| 5,565,132 A | 10/1996 | Salyer |
| 5,601,861 A | 2/1997 | Gerrish et al. |
| 5,736,178 A | 4/1998 | Cook et al. |
| 6,097,017 A | 8/2000 | Pickford |
| 6,214,403 B1 | 4/2001 | Broberg et al. |
| 6,261,625 B1 | 7/2001 | Pickford |
| 6,287,621 B1 | 9/2001 | Lacourse et al. |
| 6,288,179 B1 | 9/2001 | Baur et al. |
| 6,326,599 B1 | 12/2001 | Pickford |
| 6,399,130 B2 | 6/2002 | Parker |
| 6,413,562 B2 | 7/2002 | Conforti et al. |
| 6,458,404 B1 | 10/2002 | Adachi |
| 6,503,546 B1 | 1/2003 | Ferrari-Philippe et al. |
| 6,613,370 B1 | 9/2003 | Pickford |
| 6,620,447 B1 | 9/2003 | Paukkunen et al. |
| 7,147,885 B2 | 12/2006 | Asano et al. |
| 8,524,301 B2 * | 9/2013 | Pickford ............... A23L 3/005 |
| | | 426/450 |
| 8,765,202 B2 | 7/2014 | Pickford |
| 9,332,767 B2 | 5/2016 | Pickford |
| 9,433,237 B2 * | 9/2016 | Pickford ............... A23P 30/20 |
| 2001/0014363 A1 | 8/2001 | Parker |
| 2001/0024672 A1 | 9/2001 | Kondou et al. |
| 2001/0055641 A1 | 12/2001 | Conforti et al. |
| 2002/0039615 A1 | 4/2002 | Adachi |
| 2002/0119226 A1 | 8/2002 | Conforti et al. |
| 2002/0192332 A1 | 12/2002 | Pickford |
| 2003/0147998 A1 | 8/2003 | Geng et al. |
| 2003/0198711 A1 | 10/2003 | Pickford |
| 2004/0213883 A1 | 10/2004 | Sadek et al. |
| 2005/0169099 A1 | 8/2005 | Sprinkle |
| 2006/0053650 A1 | 3/2006 | Manak et al. |
| 2006/0286240 A1 | 12/2006 | Roosjen |
| 2011/0091612 A1 * | 4/2011 | Pickford ............... A23L 3/005 |
| | | 426/94 |
| 2011/0177200 A1 | 7/2011 | Pickford |
| 2011/0177210 A1 | 7/2011 | Pickford |
| 2011/0177211 A1 | 7/2011 | Pickford |
| 2012/0196004 A1 | 8/2012 | Pickford |
| 2012/0196005 A1 | 8/2012 | Pickford |
| 2012/0288592 A1 | 11/2012 | Pickford |
| 2013/0156925 A1 | 6/2013 | Pickford et al. |
| 2014/0087051 A1 | 3/2014 | Pickford et al. |
| 2014/0093615 A1 | 4/2014 | Pickford |
| 2014/0248398 A1 | 9/2014 | Pickford |
| 2014/0255552 A1 | 9/2014 | Pickford |
| 2014/0363540 A1 | 12/2014 | Pickford |
| 2015/0147440 A1 | 5/2015 | Van Der Kolk et al. |
| 2015/0216208 A1 | 8/2015 | Michiels et al. |

FOREIGN PATENT DOCUMENTS

| | | |
|---|---|---|
| DE | 2338180 A1 | 2/1975 |
| EP | 17338 A1 | 10/1980 |
| EP | 109226 A1 | 5/1984 |
| EP | 0155760 A1 | 2/1986 |
| EP | 273475 A1 | 7/1988 |
| EP | 327332 A2 | 8/1989 |
| EP | 344726 A2 | 12/1989 |
| EP | 392119 A2 | 10/1990 |
| EP | 0510320 A1 | 10/1992 |
| EP | 510320 A1 | 10/1992 |
| EP | 648433 A2 | 4/1995 |
| EP | 1929887 A1 | 6/2008 |
| EP | 2207434 B1 | 8/2011 |
| EP | 2359697 A2 | 8/2011 |
| EP | 2374361 A1 | 10/2011 |
| EP | 2481294 A1 | 8/2012 |
| EP | 2481295 A1 | 8/2012 |
| FR | 2337534 A1 | 8/1977 |
| FR | 2343668 A1 | 10/1977 |
| FR | 2458227 A1 | 1/1981 |

(56) References Cited

FOREIGN PATENT DOCUMENTS

| | | | |
|---|---|---|---|
| GB | 1419455 | | 12/1975 |
| GB | 2226220 | A | 6/1990 |
| GB | 2461520 | A * | 1/2010 ............ A23L 3/005 |
| JP | 57159451 | | 10/1982 |
| JP | 01168242 | | 7/1989 |
| RU | 2277438 | C2 | 6/2006 |
| WO | 8501188 | A1 | 3/1985 |
| WO | 8806007 | A1 | 8/1988 |
| WO | 8806847 | A1 | 9/1988 |
| WO | 8908549 | A1 | 9/1989 |
| WO | 9201384 | A1 | 2/1992 |
| WO | 9303634 | A1 | 3/1993 |
| WO | 9306752 | A1 | 4/1993 |
| WO | 9314995 | A1 | 8/1993 |
| WO | 9413160 | A1 | 6/1994 |
| WO | 9419917 | A1 | 9/1994 |
| WO | 9427887 | A1 | 12/1994 |
| WO | 9507629 | A1 | 3/1995 |
| WO | 9523523 | A1 | 9/1995 |
| WO | 9524110 | A2 | 9/1995 |
| WO | 9530344 | A1 | 11/1995 |
| WO | 9602149 | A1 | 2/1996 |
| WO | 9622228 | A2 | 7/1996 |
| WO | 9632026 | A1 | 10/1996 |
| WO | 9638054 | A1 | 12/1996 |
| WO | 9703572 | A1 | 2/1997 |
| WO | 9729653 | A1 | 8/1997 |
| WO | 9944439 | A1 | 9/1999 |
| WO | 2005112664 | A1 | 12/2005 |
| WO | 2006030333 | A1 | 3/2006 |
| WO | 2006082804 | A1 | 8/2006 |
| WO | 2008078997 | A1 | 7/2008 |
| WO | 2010001101 | A2 | 1/2010 |

OTHER PUBLICATIONS

United States Patent and Trademark Office, "Office Action," issued in connection with U.S. Appl. No. 12/764,428, dated Mar. 22, 2013.
United States Patent and Trademark Office, "Office Action," issued in connection with U.S. Appl. No. 12/764,421, dated Apr. 1, 2013.
United States Patent and Trademark Office, "Office Action," issued in connection with U.S. Appl. No. 12/764,407, dated Apr. 5, 2013.
United States Patent and Trademark Office, "Office Action," issued in connection with U.S. Appl. No. 13/331,900, dated Apr. 10, 2013.
United States Patent and Trademark Office, "Office Action," issued in connection with U.S. Appl. No. 13/015,491, dated Jun. 5, 2013.
United States Patent and Trademark Office, "Office Action," issued in connection with U.S. Appl. No. 13/107,814, dated Jun. 21, 2013.
United States Patent and Trademark Office, "Office Action," issued in connection with U.S. Appl. No. 09/000,319, dated Feb. 3, 1999.
United States Patent and Trademark Office, "Office Action," issued in connection with U.S. Appl. No. 09/000,319, dated Mar. 27, 2000.
United States Patent and Trademark Office, "Office Action," issued in connection with U.S. Appl. No. 09/381,848, dated Sep. 26, 2000.
United States Patent and Trademark Office, "Office Action," issued in connection with U.S. Appl. No. 09/381,848, dated May 8, 2001.
United States Patent and Trademark Office, "Office Action," issued in connection with U.S. Appl. No. 09/646,068, dated May 8, 2002.
United States Patent and Trademark Office, "Office Action," issued in connection with U.S. Appl. No. 09/646,068, dated Feb. 4, 2003.
United States Patent and Trademark Office, "Office Action," issued in connection with U.S. Appl. No. 12/764,428, dated Jan. 5, 2012.
United States Patent and Trademark Office, "Office Action," issued in connection with U.S. Appl. No. 12/764,428, dated Jun. 21, 2012.
United States Patent and Trademark Office, "Office Action," issued in connection with U.S. Appl. No. 12/764,407, dated Oct. 5, 2012.
United States Patent and Trademark Office, "Office Action," issued in connection with U.S. Appl. No. 12/764,421, dated Oct. 9, 2012.
United States Patent and Trademark Office, "Office Action," issued in connection with U.S. Appl. No. 13/015,486, dated Oct. 12, 2012.
United States Patent and Trademark Office, "Office Action," issued in connection with U.S. Appl. No. 13/015,491, dated Oct. 15, 2012.
United States Patent and Trademark Office, "Office Action," issued in connection with U.S. Appl. No. 13/015,486, dated Feb. 19, 2013.
United States Patent and Trademark Office, "Office Action," issued in connection with U.S. Appl. No. 12/764,407, dated Oct. 25, 2013.
United States Patent and Trademark Office, "Office Action," issued in connection with U.S. Appl. No. 13/015,491, dated Nov. 8, 2013.
United States Patent and Trademark Office, "Office Action," issued in connection with U.S. Appl. No. 13/015,486, dated Jan. 8, 2014.
United States Patent and Trademark Office, "Office Action," issued in connection with U.S. Appl. No. 13/107,814, dated Feb. 13, 2014.
United States Patent and Trademark Office, "Office Action," issued in connection with U.S. Appl. No. 14/029,681, dated Apr. 2, 2014.
United States Patent and Trademark Office, "Office Action," issued in connection with U.S. Appl. No. 13/015,486, dated Jul. 1, 2014.
United States Patent and Trademark Office, "Office Action," issued in connection with U.S. Appl. No. 13/953,585, dated Jul. 8, 2014.
United States Patent and Trademark Office, "Office Action," issued in connection with U.S. Appl. No. 13/015,491, dated Sep. 11, 2014.
United States Patent and Trademark Office, "Office Action," issued in connection with U.S. Appl. No. 14/764,428, dated Mar. 22, 2013.
United States Patent and Trademark Office, "Notice of Allowance," issued in connection with U.S. No. Appl. No. 12/669,953, dated Jul. 25, 2013.
United States Patent and Trademark Office, "Notice of Allowance," issued in connection with U.S. Appl. No. 12/764,421, dated Apr. 11, 2014.
United States Patent and Trademark Office, "Notice of Allowance," issued in connection with U.S. Appl. No. 12/764,407, dated Feb. 12, 2014.
International Searching Authority, "Search Report and Written Opinion," issued in connection with International Application No. PCT/GB2009/001617, dated Dec. 17, 2009.
International Searching Authority, "Search Report," issued in connection with International Application No. PCT/GB97/00924, dated Jul. 30, 1997.
International Searching Authority, "Search Report," issued in connection with International Application No. PCT/GB99/00564, dated Jun. 29, 1999.
International Searching Authority, "Search Report," issued in connection with International Application No. PCT/GB92/01559, dated Dec. 30, 1992.
International Searching Authority, "Search Report," issued in connection with International Application No. PCT/GB95/00958, dated Aug. 22, 1995.
International Searching Authority, "Search Report and Written Opinion," issued in connection with International Application No. PCT/GB2011/050060, dated May 23, 2011.
International Searching Authority, "Search Report and Written Opinion," issued in connection with Application No. PCT/GB2011/050057, dated Jul. 15, 2012.
International Searching Authority, "Search Report and Written Opinion," issued in connection with International Application No. PCT/GB2011/050055, dated Jul. 15, 2012.
International Searching Authority, "Search Report and Written Opinion," issued in connection with International Application No. PCT/EP2012/076015, dated May 7, 2013.
European Patent Office, "European Search Report," issued in connection with EP Application No. 12178463, dated Jan. 22, 2013.
European Patent Office, "Extended European Search Report," issued in connection with EP Application No. 11152421.1, dated Jul. 5, 2011.
European Patent Office, "Extended European Search Report," issued in connection with EP Application No. 111582415.3, dated Jul. 5, 2011.
European Patent Office, "Extended European Search Report," issued in connection with EP Application No. 11196483.6, dated Aug. 10, 2012.
European Patent Office, "Communication Under Rule 71(3) EPC," issued in connection with EP Application No. 09772781.2, dated Mar. 14, 2011.

(56) References Cited

OTHER PUBLICATIONS

European Patent Office, "Communication Under Rule 71(3) EPC," issued in connection with EP Application No. 11163536.3, dated May 20, 2013.

Altschul, A.M., "Low-calorie foods handbook," Georgetown University School of Medicine, Marcel Dekker, Inc., Jul. 29, 1993, pp. 1-10.

Albert et al., "Adhesion in fried battered nuggets: Performance of different hydrocolloids as predusts using three cooking procedures," Food Hydrocolloids 23, 2009, pp. 1443-1448.

Henderson, A., "Cellulose ethers—The role of thermal gelation," Dow Chemical Europe, CH-8810 Horgen, Switzerland, 1988, pp. 265-275.

U.S. Dept. of Health & Human Services, "Minimum Cooking Temperatures," http://www.foodsafety.gov/keep/charts/mintemp/html, last accessed Sep. 30, 2012.

Kuntz, Lynn A., "The Great Cover-Up: Batters, Breadings & Coatings," http://www.foodproductdesign.com, Apr. 1997.

Clextral, "Press Release: New drying technology provides optimal drying for complex products and reduces energy expense," Clextral—division of Groupe Legris Industries, Jun. 2009.

Clextral, "Rotante Evolum Dryer—New generation for sustainable development," Clextral—division of Groupe Legris Industries, Jun. 2009.

Perten, Harald, "Application of the falling number method for evaluating alpha-amylase activity," Cereal Chemistry, vol. 41, May 1964, pp. 127-140.

Edwards, W.P., "The Science of Bakery Products," Chapter 7—Raw Materials, The Royal Society of Chemistry, 2007.

The Artisan, "Criteria for Judging Quality," http://theartisan.net/flour_criteria_judging.htm, published Jun. 20, 2008, last accessed Jun. 17, 2016.

\* cited by examiner

DRIED CRUMB MANUFACTURE

CROSS REFERENCE TO RELATED ED APPLICATIONS

This application is a continuation of U.S. patent application Ser. No. 14/505,402 filed on Oct. 2, 2014, entitled CRUMB MANUFACURE, now pending, which is a continuation of U.S. patent application Ser. No. 14/029,681 filed on Sep. 17, 2013, entitled CRUMB MANUFACTURE, now abandoned, which is a continuation of U.S. patent application Ser. No. 13/331,900 filed on Dec. 20, 2011, entitled CRUMB MANUFACTURE, now abandoned. Each of these prior applications is incorporated herein by reference in its entirety and for all purposes.

BACKGROUND

This invention relates to a process for manufacture of crumb. The invention also relates to crumb manufactured by the process and food products coated with the crumb. The invention relates particularly, but not exclusively, to crumb which includes a hydrocolloid or other gelling agent in order to impart water resistant characteristics.

Conventional breadcrumb may have a water content of about 4% to 12% and becomes soggy immediately upon immersion into water. Such crumb is inevitably for use in moist environments, particularly for coating microwaveable products.

WO99/44439 describes a process for manufacture of breadcrumb by extrusion of a dough mixture incorporating a gelling agent, particularly a hydrocolloid, to form pellets which are dried and milled. WO2010/001101 discloses a process wherein crumb is extruded with a gelling agent and dried to a moisture content of 2% or is dried in a fluid bed dryer at around 90° C. for fifteen minutes. Use of a fluid bed dryer may be undesirable due to creation of a large amount of airborne dust. Fluid bed dryers are designed to dry products as they float on a cushion of air or gas. The air or gas used in the process is supplied to the bed through a special perforated distributor plate and flows through the bed of solids at a velocity sufficient to support the weight of particles in the fluidized state. Bubbles form and collapse within the fluidized bed of material promoting intense particle movement.

DETAILED DESCRIPTION

Figure 1:
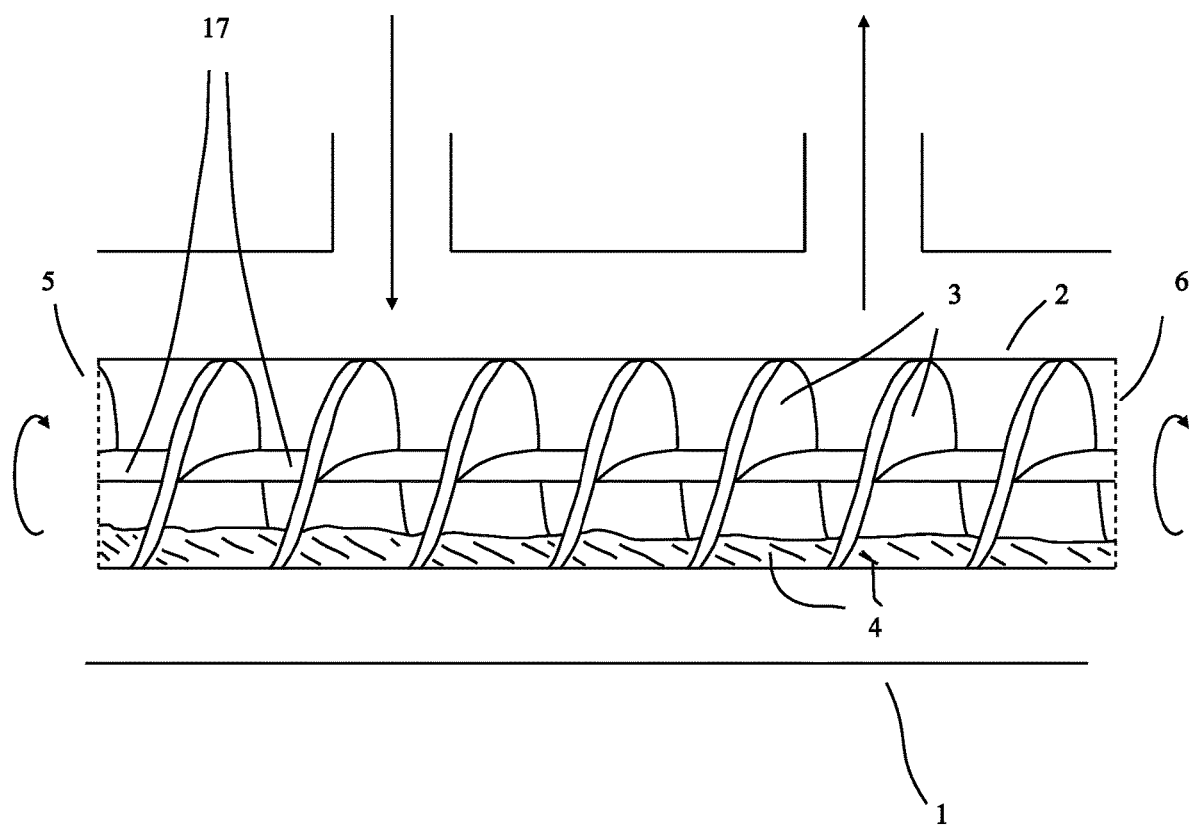
FIG. 1 is a schematic view of a drying apparatus for use in accordance with an embodiment of the invention.

According to a first aspect of the present invention, a method of manufacture of a crumb comprises: extruding a dough composition comprising flour, a gelling agent, optional further ingredients and water to form an extruded composition, wherein the gelling agent is uniformly distributed throughout the composition; drying the extruded composition in a rotary dryer to form a dried composition, wherein the water content of the dried composition is from about 0.1% to about 1.5% by weight; and milling the dried composition to form a crumb with a water content of about 0.1% to about 1.5% by weight.

The present method offers the advantage that it enables the manufacture of a crumb with an extremely low moisture content without the need for substantial energy input. Furthermore, the method achieves such very low moisture content without significant adverse effect on product quality. Alternative drying techniques would typically achieve such very low moisture content at the cost of e.g. heat induced defects. The crumb according to the present invention offers the advantage that it is substantially more water resistant than crumb having a moisture level of about 2.0 wt % and/or crumb that does not contain a gelling agent. The high water resistance of the crumb obtained by the present method is particularly beneficial if this crumb is used in the manufacture of coated food products that are distributed in frozen form and that have to be heated before consumption.

Percentages and other quantities referred to in this specification are by weight, unless indicated otherwise.

In a preferred embodiment the rotary dryer comprises an inlet; an outlet; a passageway for the extruded composition; the passageway extending between the inlet and outlet; one or more drying units each comprising a perforated cylindrical tube extending between the inlet and outlet and a screw extending axially of the tube, wherein one of the tube and the screw are rotatable to move extruded composition from the inlet to the outlet; and means for circulating drying air through the passageway.

The rotary dryer may comprise at least four drying units assembled in a rotary cage located within a closed housing.

The apertures in the perforated cylindrical tubes are selected to be smaller than at least 90 wt % of the particles of the extruded composition. Preferably, the dimension of the apertures in the perforated cylindrical tube is in the range of about 1 mm to about 5 mm.

The extruded composition is preferably dried in the rotary dryer using a countercurrent hot air stream. The countercurrent hot air stream typically has a temperature of 100° C.-160° C., more preferably of 130° C.-150° C., most preferably about 140° C. Flow rates of hot air employed in the present method are typically in the range of about 6 to about 15 m/s, preferably of 8-10 m/s.

This invention utilizes a gelling agent, particularly a hydrocolloid, dispersed uniformly in a rigid extruded farinaceous matrix structure which when dried to a water content of 1.5% by weight or lower reduces hydration and swelling of the hydrocolloid upon exposure to moisture thus creating a water esistant barrier. The farinaceous matrix advantageously comprises low gluten wheat flour.

Without wishing to be bound by theory it is believed that upon exposure to moisture the gelling agent hydrates at the surface of the crumb or elsewhere in contact with moisture but cannot expand within the structure of the crumb. This may result in formation of a barrier to passage of water into the body of the crumb.

Preferably, the particles have a maximum dimension between dust having a dimension of about 0.1 mm and about 5 mm Crumb having a substantial absence of fine particles or dust may be used for outer coating of products. The dust may be used in the coating process as a predust or as an infill between larger particles.

Preferably, the water content of the dried composition and crumb is from about 0.3% to about 1%, more preferably about 0.5% to about 1%, most preferably about 0.5% to about 0.6%.

Crumb made by the method of this invention has the advantage of moisture resistance during cooking or reheating in a thermal, microwave or combined thermal and microwave oven. The crumb finds particular application for use in products which are frozen for storage before use. Uniform distribution of the gelling agent, especially a hydrocolloid, throughout the crumb imparts water resistance to the entire body of the crumb, and not to a superficial outer layer which may become damaged in use.

Reduction of the water content of the crumb below 1.5% confers an unexpected degree of moisture resistance to the crumb. Thus, the crumb can be used to produce a crumb coated food product which is crisp and has a crunchy texture. Without wishing to be bound by theory, it is believed that reduction of the water content as claimed reduces the rate of re-hydration of the gelling agent in contact with water, prolonging the period during which the crumb remains crisp. This is particularly important in crumb coated microwaveable products because steam emitted from the core of the product passes through the coating, making conventional crumb coated products soggy and unpalatable. The very low water content of the crumb further provides the unexpected advantage that the crumb exhibits a low pick-up of oil during frying.

The gelling agent is preferably a hydrocolloid which forms a gel or otherwise increases in viscosity when mixed with water. Preferred hydrocolloids produce a milled extrudate which retains shape when stirred in water having a temperature of 20° C. for a period of 60 seconds. The hydrocolloid provides a degree of water resistance reducing any tendency to pick up moisture from adjacent layers of the food product or surrounding materials. Typically, hydrocolloid is contained in the milled extrudate in a concentration of about 0.06% to about 4%, more preferably about 0.08% to about 3%, and most preferably about 0.1% to about 3% by weight.

Examples of hydrocolloids that may be used include natural gums, modified gums, gelatin, pectin, alginate, arabinogalactan, agar, carrageenan, furcellaran, modified starch and combinations thereof. Preferably, the hydrocolloid is selected from natural gums and combinations thereof.

Examples of natural gums that may be suitably employed include guar gum, locust bean gum, gum arabic, tragacanth, gum karaya, gum ghatti, xanthan gum and combinations thereof.

Most preferably, the hydrocolloid is selected from guar gum, locust bean gum, xanthan gum and combinations thereof.

The extrudate may be cut into pieces upon discharge from the extruder in order to form pieces of solid farinaceous material. Preferably, the pieces may expand to form rounded pellets or beads suitable for passage through a dryer before milling. The beads may have a maximum dimension of 0.5 cm to 1 cm.

The extruded composition obtained in the present method has a water content of about 0.1% to about 1.5 wt. %, more preferably of about 0.3 wt. %.

Extruded crumb may be manufactured as disclosed in WO2010/001101, the disclosure of which is incorporated into this specification by reference for all purposes.

In a preferred embodiment the dryer comprises an inlet, an outlet, a passageway for pieces of extrudate, the passageway extending between the inlet and the outlet, means for circulating drying air through the passageway and means for mixing the pieces of the extrudate during passage through the passageway; wherein the passageway comprises a perforated cylindrical tube extending between the inlet and outlet; apertures in the tube having a maximum dimension arranged to retain extrudate particles within the tube; the means for mixing comprising a screw extending axially of the tube; and one of the tube and screw being rotatable to move extrudate from the inlet to the outlet.

Preferably, the screw remains stationary as the tube rotates. Alternatively, the screw may rotate within a stationary tube. Rotation of the tube is preferred to cause thorough mixing of the extrudate particles during passage along the tube. Use of the apparatus in accordance with this aspect of the invention is advantageous because the particles are mixed by tumbling rather than application of a mechanical mixer. This reduces breakage of the particles and consequent formation of dust.

The tube may be constructed from wire mesh or perforated sheet material having apertures sufficiently small to retain the extrudate pieces. Dust or fine particles are separated from the pieces by being allowed to fall through apertures in the rotating tube into a collector at a lower part of the apparatus. For example, a trough may be provided with an Archimedes screw for carrying dust out of the apparatus. Rotation of the tube has the advantage of agitating the dust or fine particles, promoting flow of the latter through the apertures in the tube, providing convenient separation of the fines from the pieces of extruded composition.

In particularly advantageous embodiments, a multiplicity of tubes are mounted in a dryer chamber, ventilation means being provided to circulate dry heated air within the chamber. Heat exchangers may be used to heat the air passing into or within the chamber.

A vibratory feeder may be used to introduce extrudate into the or each tube. A vibratory collector may be used to collect the dried extrudate.

The dryer chamber may be divided into two or more zones maintained at different temperatures or humidities. A first zone may be at a higher temperature, for example in the range from about 120° C. to about 160° C., preferably about 130° C. to about 150° C., more preferably about 140° C. A second zone may be at a lower temperature, for example in the range from about 80° C. to about 140° C., preferably about 90° C. to about 120° C., more preferably about 100° C. The dwell time in the dryer may be about 45 minutes to 90 minutes, preferably about 60 minutes.

Another aspect of the invention relates to a crumb comprising milled farinaceous particles of an extruded composition comprising flour, a gelling agent uniformly distributed throughout the crumb and optional further ingredients, wherein the total water content of the crumb is from about 0.1% to about 1.5% by weight, more preferably from about 0.3% to about 1%, even more preferably about 0.5% to about 1%, most preferably about 0.5% to about 0.6%.

Preferred embodiments of the present crumb have already been discussed above in relation to the manufacturing method.

The aforementioned crumb is preferably obtainable by the method described herein. Most preferably, the crumb is obtained by said method.

The invention is further described by means of example, but not in any limitative sense, with reference to the accompanying drawings.

EXAMPLE 1

A flour composition was prepared from the following ingredients as follows:

| | |
|---|---|
| Flour mixute | 96.4% |
| Sodium bicarbonate (Bex ® baking powder) | 2.0% |
| Glyceryl Monostearate (Abimono SS40P) | 0.6% |
| Salt | 1.0% |
| | 100.0% |

A gelling composition was prepared from the following ingredients:

| | |
|---|---|
| Guar gum | 67.00% |
| Sodium metabisulphite | 33.00% |
| | 100.00% |

The gelling composition was hydrated at 3% w/w in 97% water. This can be done using a paddle mixer but a high shear mixer is preferred. The hydrated mixture was left to stand for at least 12 hours after mixing.

The flour composition (150 kg per hour) was mixed with water (35 kg per hour) to form a slurry. The slurry was fed into a Clextral™ twin-screw extruder (alternatively a Buhler™ twin-screw extruder may be used). The hydrated gelling composition was injected into the extruder barrel in an amount of 7.5% (13.88 kg per hour). The resultant extruded mixture was chopped into pieces and allowed to expand to form bubble-shaped pieces having a typical maximum dimension of 0.5 cm to 1.0 cm.

EXAMPLE 2

The bubble-shaped pieces of extrudate were fed into the input of a dryer as shown schematically in FIG. 1.

The dryer comprised an outer casing (1) defining a chamber containing twelve gauze tubes (2) each having a diameter of about 30 centimeters and a length of about 11.5 meters. An Archimedes screw (3) with 57 turns and a pitch of 30 centimeters for each turn extends coaxially within each tube (2) adjacent the inner surface of the tube. The tubes are connected by a drive mechanism to a motor (not shown) and are arranged to rotate around the stationary Archimedes screws (3). Tumbling of crumb particles (4) against the surface of the screw causes the particles to move along the tubes from the inlet (5) to the outlet (6).

Figure 2:
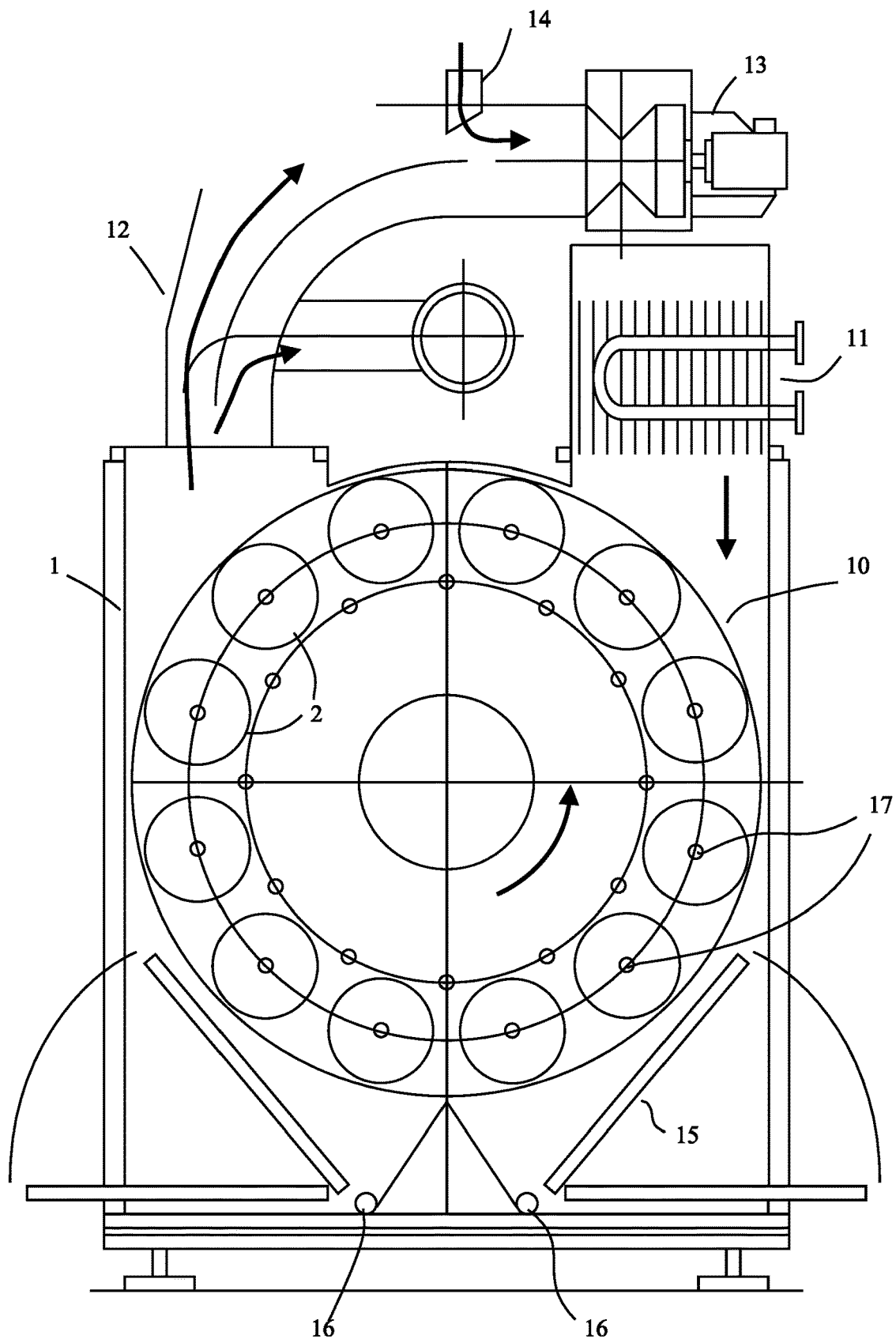
FIG. 2 is a cross-sectional view of a dryer for use in accordance with an embodiment of the invention.

FIG. 2 is a cross-sectional view of the dryer. The casing (1) encloses an array of twelve or other convenient number of cylindrical tubes (2) arranged in a cylindrical array (10) for rotation in the casing about a longitudinal axis. A drive mechanism (not shown), for example a chain drive, causes the tubes (2) to rotate about the axis (17) of Archimedes screws (3) (as shown in FIG. 1). A heat exchanger (11) provides heated air for circulation within the casing (1). Air is removed from an outlet (12) by a pump (13), arranged to recirculate air together with fresh air from inlet (14) to the heat exchanger (11).

Collector plates (15) located at a lower portion of the casing (1) beneath the array (10) of cylindrical tubes collects dust or other fines falling from the cylindrical tubes. Archimedes screws (16) serve to collect the dust and fines for delivery to an outlet (not shown).

An outer casing includes a chamber and an air circulation system including a heat exchanger to provide dry heated air.

The chamber is divided into two or more zones. A first zone may be maintained at a first higher temperature, for example about 140° C. and a second zone may be maintained at a second lower temperature, for example about 100° C. Any convenient number of zones may be maintained at temperatures selected to provide an efficient drying profile to suit the dimensions and principal characteristics of the particles.

Each tube may have a diameter of about 30 cm and may surround a coaxial screw with a pitch of about 30 cm.

The retention time within the dryer may be adjusted by varying the rate of rotation of the tubes to provide a throughput of 1200 kg/hr and a dwell time in the dryer of about 60 minutes.

A vibratory feeding system may be provided to introduce undried particles into the tubes. Each tube may be provided with a separate loading shovel. A vibratory collector may be provided to collect dried particles for delivery to a mill.

The dried particles were milled using a roller mill.

The milled crumb was sieved and fractions were collected with dimensions of below 0.8 mm, from 0.8-2.0 mm and from 2.0 to 3.5 mm. The water content of the crumb was determined to be 0.5 wt % to 0.6 wt %.

What is claimed is:

1. A dried crumb comprising a hydrocolloid dispersed uniformly in a rigid extruded farinaceous matrix structure wherein the dried crumb has been dried such that the dried crumb has a reduced rate of re-hydration of the hydrocolloid in contact with water compared with another crumb not so dried and not containing a hydrocolloid uniformly dispersed in a rigid extruded farinaceous matrix structure that is also in contact with water and wherein the hydrocolloid has water hydration resistance through the entire dried crumb.

2. The dried crumb of claim 1, wherein the farinaceous matrix structure comprises wheat flour and the dried crumb retains its shaped when stirred in water having a temperature of 20° C. for a period of 60 seconds.

3. The dried crumb of claim 1, wherein the water content of the dried crumb is from about 0.3% to about 1% by weight and wherein the hydrocolloid has been hydrated for at least 12 hours prior to being incorporated into the rigid extruded farinaceous matrix structure.

4. The dried crumb of claim 1, wherein the water content of the dried crumb is from about 0.5% to about 1% by weight.

5. The dried crumb of claim 4, wherein the water content of the dried crumb is from about 0.5% to about 0.6% by weight.

6. A crumb comprising milled farinaceous particles of an extrudate composition comprising flour, one or more hydrocolloid selected from natural gums and combinations thereof, wherein the one or more hydrocolloid is uniformly distributed throughout the crumb and the crumb retains shape when stirred in water for 60 seconds at a temperature of 20° C.

7. The crumb as claimed in claim 6, wherein the one or more hydrocolloid has been hydrated for at least 12 hours prior to being incorporated into the extrudate composition.

8. The crumb of claim 7, wherein the one or more hydrocolloid is selected from the group consisting of: guar gum, locust bean gum, gum arabic, tragacanth, gum karaya, gum ghatti, xanthan gum and combinations thereof.

9. The crumb of claim 8, wherein the one or more hydrocolloid is selected from the group consisting of: guar gum, locust bean gum, xanthan gum and combinations thereof and wherein the water content of the crumb is from about 0.1% to about 1.5% by weight water.

10. The crumb of claim 6, wherein the one or more hydrocolloid in the extrudate composition is present in an amount of from about 0.06% to about 4% by weight.

11. The crumb of claim 10, wherein the one or more hydrocolloid in the extrudate composition is present in an amount of from about 0.08% to about 3% by weight.

12. The crumb of claim 6, wherein the one or more hydrocolloid in the extrudate composition is present in an amount of from about 0.01% to about 3% by weight.

13. A dried crumb comprising a hydrocolloid dispersed in a rigid extruded farinaceous matrix structure wherein the crumb has been dried such that the dried crumb has a reduced rate of re-hydration of the hydrocolloid in contact with water and wherein the hydrocolloid has water resistance through the entire dried crumb and wherein the total water content of the dried crumb is less than about 1.5% by weight of the dried crumb and wherein the hydrocolloid is present in an amount of from about 0.06% to about 4% by weight of the dried crumb.

14. The dried crumb of claim 13, wherein the hydrocolloid is present in an amount of from about 0.1% to about 3% by weight of the dried crumb and wherein the hydrocolloid has been hydrated for at least 12 hours prior to being incorporated into the rigid extruded farinaceous matrix structure.

15. The dried crumb of claim 14, wherein the hydrocolloid is uniformly dispersed in the rigid extruded farinaceous matrix structure and the dried crumb retains its shape when stirred in water having a temperature of 20° C. for a period of 60 seconds.

16. The dried crumb of claim 15, wherein the hydrocolloid comprises at least one gum selected from the group consisting of: guar gum, locust bean gum, gum arabic, tragacanth, gum karaya, gum ghatti, xanthan gum and combinations thereof.

17. The dried crumb of claim 16, wherein the at least one gum is selected from the group consisting of: guar gum, locust bean gum, xanthan gum and combinations thereof and wherein the water content of the dried crumb is from about 0.1% to about 1.5% by weight water.

18. The dried crumb of claim 17, wherein the dried crumb has a water content of from about 0.5% to about 1%.

19. The dried crumb of claim 18, wherein the dried crumb will pass through a 3.5 mm or less size sieve and the hydrocolloid is formed into a gelling composition prior to being dispersed in the rigid farinaceous matrix structure and the gelling composition comprises about 3% by weight of the hydrocolloid and sodium metabisulphite 97% by weight water.

20. The dried crumb of claim 19, wherein the hydrocolloid is selected from guar gum, locust bean gum, xanthan gum and combinations thereof.

* * * * *